United States Patent
Paquelet et al.

(10) Patent No.: US 7,551,891 B2
(45) Date of Patent: Jun. 23, 2009

(54) METHOD FOR DETECTING UWB PULSE SEQUENCES WITHOUT LOCAL PULSE GENERATION

(75) Inventors: Stephane Paquelet, Rennes Cedex (FR); Louis-Marie Aubert, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 650 days.

(21) Appl. No.: 11/082,898

(22) Filed: Mar. 18, 2005

(65) Prior Publication Data

US 2005/0232381 A1 Oct. 20, 2005

(30) Foreign Application Priority Data

Mar. 22, 2004 (EP) .................................. 04290764

(51) Int. Cl.
*H04B 7/24* (2006.01)

(52) U.S. Cl. ............................ 455/39; 455/73; 455/326; 455/337; 455/42; 375/150; 375/256; 375/325; 375/365

(58) Field of Classification Search .................... 455/39, 455/73, 326, 337, 42; 375/130, 237, 239, 375/342, 343, 324, 150, 325, 256, 365, 367, 375/368; 329/313
See application file for complete search history.

(56) References Cited

U.S. PATENT DOCUMENTS

| | | | |
|---|---|---|---|
| 5,832,035 A | 11/1998 | Fullerton | |
| 6,282,228 B1 * | 8/2001 | Monroe | 375/140 |
| 6,556,621 B1 | 4/2003 | Richards et al. | |
| 2002/0031170 A1 * | 3/2002 | Yoon | 375/140 |
| 2002/0075972 A1 * | 6/2002 | Richards et al. | 375/324 |
| 2005/0232381 A1 | 10/2005 | Paquelet et al. | |

OTHER PUBLICATIONS

U.S. Appl. No. 11/436,702, filed May 19, 2006, Paquelet et al.
U.S. Appl. No. 11/082,898, filed Mar. 18, 2005, Paquelet et al.
U.S. Appl. No. 11/085,517, filed Mar. 22, 2005, Paquelet.
Zhengyuan Xu, et al., "Frequency-Domain Estimation of Multiple Access Ultra-Wideband Signals", IEEE workshop on statistical signal processing, XP-010699683, Sep. 28, 2003, pp. 74-77.
Younes Souilmi, et al., "On the Achievabel Rates of Ultra-Wideband PPM With Non-Coherent Detection in Multipath Environments", IEEE International Conference on Communications, vol. 1 of 5, XP-010643101, May 11, 2003, pp. 3530-3534.

\* cited by examiner

*Primary Examiner*—Tuan A Pham
(74) *Attorney, Agent, or Firm*—Oblon, Spivak, McClelland, Maier & Neustadt, P.C.

(57) ABSTRACT

The invention relates to a method for transmitting at least one sequence of Np pulses over Np time windows, each pulse being enclosed within a predetermined time chip Tc.

The method according to the invention includes a signal detection step, in the course of which Np detection windows Dj. (for j=1 to Np) encompassing predetermined time chips are examined by performing correlations over said detection windows Dj of the received signal with at least a first and a second sinusoidal signal S1 and S2.

The method according to the invention enables to limit the processing time and power needed for carrying out the detection step, which only requires to examine detection windows defined by a signature of a transmitter by using sinusoidal signals, instead of mapping the whole pulse sequence by means of a correlation with expected pulses.

8 Claims, 3 Drawing Sheets

METHOD FOR DETECTING UWB PULSE SEQUENCES WITHOUT LOCAL PULSE GENERATION

BACKGROUND OF THE INVENTION

1. Field of the Invention

The present invention relates to a method for transmitting data in a telecommunication system including at least one transmitter and one receiver, said transmitter being intended to transmit a signal formed by at least one sequence of Np pulses over Np time windows, each pulse being enclosed within a time chip whose position within its relevant time window is defined by a chip number.

2. Description of Background Art

Such data transmission methods are currently studied with the aim of assessing the relevance of so-called Ultra-Wide Band telecommunication systems (further referred to as UWB systems). In such a system each transmitter may be identified by a signature formed by the above-mentioned chip numbers, which signature is in itself quite sturdy and may thus be reliably and accurately communicated to all potential receivers.

The pulses used in UWB systems are very short, having for example a duration lower than 0.1 nanosecond, which offers to such systems bandwidths at least as large as 10 GigaHertz, entailing high flexibility and hence numerous possible applications for such systems.

The above-described signal may form a carrying signal on which information can be encoded by modulation of said carrying signal, for example by performing phase or amplitude modulation of one or more pulse sequences.

A major problem which hinders development of such systems lies in the detection of incoming carrying signals by a receiver. In the present state of the art, signal detection is often performed by correlating a received signal delivered at the output of a receiving antenna, which received signal may be exclusively constituted by noise or, alternatively, may include an incoming carrying signal, with a gliding model of the waveform such a carrying signal should have.

Such a gliding correlation technique is not realistically applicable as such to the detection of sequences of Np pulses lasting less than 0.1 ns each and enclosed in time windows having each a width of roughly 100 ns. In such an example, with for example Np=128 and a sampling interval of 10 ps, the scanning of the whole duration of a pulse sequence would require $1.28 \cdot 10^6$ successive pulse sequences for its completion and would then last 16 seconds, which is not acceptable.

It should be also be noted that, during the considerable time required for performing the detection of a pulse sequence according to the technique described above, communication conditions between the transmitter and the receiver may change, i.e. a communication channel between these devices may be altered, for example due to movements of one or both devices, so that the detection conditions may be altered in the course of a single signal detection step, with adverse effects on the accuracy of the results yielded by said signal detection step. The signal carrying the pulse sequences may even disappear before its detection is completed.

BRIEF SUMMARY OF THE INVENTION

The invention aims at solving the aforementioned problems, by providing a method for transmitting data as described above, which method includes at least one signal detection step which may be carried out far more quickly and easily than currently used signal detection techniques.

Indeed, a method for transmitting data according to the opening paragraph is characterized according to the invention in that it includes at least one signal detection step to be executed by said receiver, in the course of which Np detection windows encompassing the time chips defined by the chip numbers are to be examined in search of an expected pulse sequence by performing at least a first and a second correlation over said detection windows of a signal representative of the received signal with at least a first and a second sinusoidal signal, respectively, which first and second sinusoidal signals are in phase quadrature with respect to each other, said first and second correlations being intended to produce first and second correlation values to be combined together into a single detection value intended to be compared to a predetermined threshold value.

In the detection step according to the invention, the received signal is not scanned exhaustively during the whole duration of an expected pulse sequence, as is done in the known gliding correlation technique. The scanning is instead restricted to selected portions of the expected pulse sequence. This restriction is a consequence of a difference in purpose between the detection step according to the invention and the detection steps already known in the art.

Indeed, a known detection step performed by means of a gliding correlation over the whole duration of an expected pulse sequence aims at identifying precisely the timing of the detected sequence, whereas the detection step according to the invention only aims at determining whether or not a given pulse sequence starts within a given time interval. The whole duration of a single sequence may thus be scanned stepwise, each step having a duration of the order of 1 Ons in the same conditions as those described above, which means that the scanning of a duration of an expected sequence of Np=128 pulses will only require $1.28 \cdot 10^3$ successive pulse sequences for its completion and would last 16 milliseconds, i.e. one thousand times less than according to the gliding correlation technique described above.

The invention thus enables to limit the processing time and power required for carrying out the detection step by only scanning detection windows defined by the signature of the transmitter, which will have been communicated beforehand to the receiver.

The use of sinusoidal signals for detecting incoming pulse sequences instead of pulses having a form similar to that of the expected pulses may in itself appear quite surprising, since it goes against the so-called theory of coherent systems. Nevertheless, explanations given hereinafter will demonstrate the efficiency and the validity of the choice made by the inventors.

The fact that, according to the invention, the received signal is to be correlated with sinusoidal signals enables a far more simple implementation of the detection step as is done in the known art, where a gliding correlation requires to generate, at the receiver end, pulses having the same form as those to be detected, whereas sinusoidal signals may be generated by off-the-shelf oscillators well-known to any skilled in the art, any kind of later processing to be applied to such sinusoidal signals being also simplified for like reasons.

Various techniques may be used for combining together the correlation values.

According to some embodiments of the invention, the detection value could be defined by a mean value over all detection windows of the first and second correlation values. However, the correlation values may advantageously be raised to any given power N greater than 1 in order to increase the statistical relevance of occurrences where pulses are detected in an expected configuration.

According to an advantageous embodiment of the invention, the detection value is thus obtained by squaring each of the correlation values and adding together all resulting squared values.

As will be explained hereinafter, the use of a squared correlation value will additionally allow an easy interpretation of the detection value.

The above-mentioned predetermined threshold value will preferably be independent of an amplitude of the received signal, in order to ensure that communication conditions such as channel attenuation have no significant impact on the outcome of the signal detection step.

According to one of its hardware-oriented aspects, the invention also relates to a telecommunication system including at least one transmitter and one receiver, said transmitter being intended to transmit a signal formed by at least one sequence of Np pulses over Np time windows, each pulse being enclosed within a time chip whose position within its relevant time window is defined by a chip number, system in which the receiver includes signal detection means intended to perform an examination of Np detection windows encompassing the time chips defined by the chip numbers in search of an expected pulse sequence, said detection means including at least first and second correlation means for correlating a signal representative of the received signal with at least a first and a second sinusoidal signal, respectively, which first and second sinusoidal signals are in phase quadrature with respect to each other, said first and second correlation means being intended to be activated during said detection windows and to produce first and second correlation values to be combined together into a single detection value intended to be fed to comparison means intended to compare said detection value with a predetermined threshold value.

According to a particular embodiment of such a system, the detection means further include at least third and fourth correlation means for correlating a signal representative of the received signal with at least a third and a fourth sinusoidal signal, respectively, which third and fourth sinusoidal signals are in phase quadrature with respect to each other, said third and fourth correlation means being intended to be activated during said detection windows and to produce third and fourth correlation values to be combined together with the first and second correlation values into a single detection value intended to be fed to comparison means, the detection means also including a phase quadrature demodulator intended to be fed with the received signal and to respectively deliver a first and a second demodulated signal to the first and second correlation means, on the one hand, and to the third and fourth correlation means, on the other hand, which first and second demodulated signals are in phase quadrature with respect to each other.

According to known phase quadrature demodulation techniques, the phase quadrature demodulator will usually include two mixers intended to be fed with the received signal, on the one hand, and by demodulation signals in phase quadrature with each other having a predetermined so-called central frequency, the third and fourth sinusoidal signals being then respectively formed by the first and second sinusoidal signals. In a preferred embodiment of the invention, the detection means will further include:
- an oscillator intended to generate an output signal from which the first and second sinusoidal signals will be derived, and
- a frequency multiplier intended to receive said output signal and to deliver respective first and second demodulation signals to the phase quadrature demodulator.

According to such an embodiment of the invention, the central frequency will have a value which will be a multiple of the frequency of the sinusoidal signals, which enables to use only one oscillator at the receiving end for performing both a frequency demodulation and a detection of an incoming pulse sequence.

According to a preferred embodiment of the invention, the detection means comprised in a system as described above further include:
- a plurality of accumulating modules, each of which being intended to accumulate output values delivered by one of said correlating means,
- a plurality of squaring modules, each of which being intended to produce a squared value of the contents of one of said accumulating modules, and
- an additioner intended to compute a sum of output values delivered by the squaring modules in order to produce a detection value which will be compared to the predetermined threshold value.

According to another of its hardware-oriented aspects, the invention also relates to a device intended to receive a signal formed by at least one sequence of Np pulses over Np time windows, each pulse being enclosed within a time chip whose position within its relevant time window is defined by a chip number, which receiver includes signal detection means intended to perform an examination of Np detection windows encompassing the time chips defined by the chip numbers in search of an expected pulse sequence, said detection means including at least first and second correlation means for correlating a signal representative of the received signal with at least a first and a second sinusoidal signal, respectively, which first and second sinusoidal signals are in phase quadrature with respect to each other, said first and second correlation means being intended to be activated during said detection windows and to produce first and second correlation values to be combined together into a single detection value intended to be fed to comparison means intended to compare said detection value with a predetermined threshold value.

The detection means included in such a receiver will thus be able to execute a signal detection step according to the above-described embodiments of the invention.

BRIEF DESCRIPTION OF THE DRAWINGS

The characteristics of the invention mentioned above, as well as others, will emerge more clearly from a reading of the following description given in relation to the accompanying figures, amongst which.

DETAILED DESCRIPTION OF THE INVENTION

Figure 1:
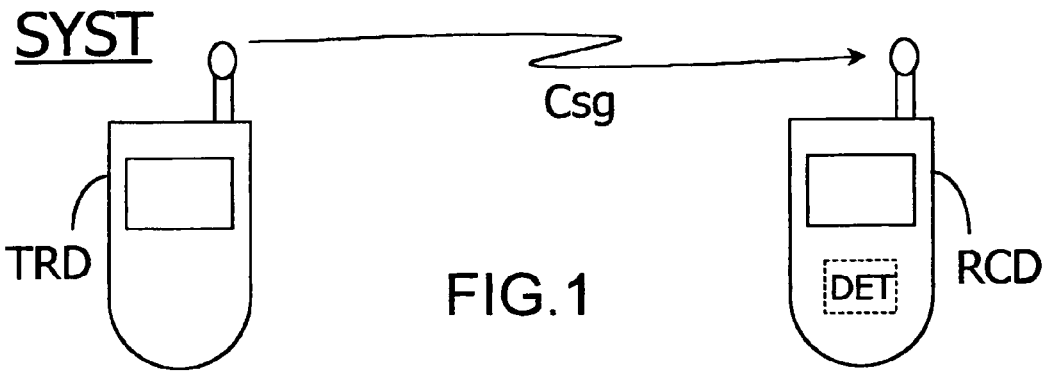
FIG. 1 is a functional diagram depicting a telecommunication system in which the invention is used.

FIG. 1 depicts a telecommunication system SYST in which the invention is embodied. This system SYST includes at least one transmitting device TRD and one receiving device RCD, which may for example be constituted by mobile phones. The transmitting device TRD is intended to transmit a signal Csg formed by at least one sequence of Np pulses pj (for j=1 to Np) over Np time windows, each pulse being enclosed within a time chip whose position within its relevant time window is defined by a chip number cj (for j=1 to Np).

The receiving device RCD is provided with detection means DET for detecting such an incoming signal Csg.

This signal Csg may form a carrying signal on which information can be encoded by the transmitting device TRD by means of a modulation of said carrying signal Csg, for example by performing phase or amplitude modulation of one or more pulse sequences.

Figure 2:
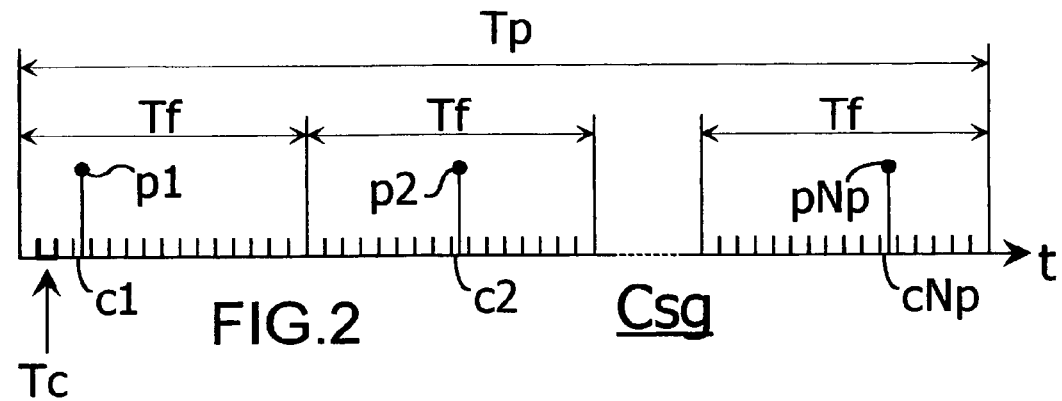
FIG. 2 is a chronogram depicting a pulse sequence constituting a carrying signal transmitted in such a telecommunication system.

FIG. 2 depicts such a carrying signal Csg in the form of a chronogram, according to which each pulse sequence has a total duration Tp divided into time windows having each a duration Tf, each time window being sub-divided into time chips Tc, a single time chip within each window being intended to enclose a pulse pj (for i=1 to Np), which single time chip is identified by means of a chip number cj. The transmitter of this carrying signal Csg will thus be identified by a signature Sg=(c1, c2 . . . cNp) jointly formed by all above-mentioned chip numbers cj (for i=1 to Np), which signature Sg is in itself quite sturdy and may thus be reliably and accurately communicated to all potential receivers.

Figure 3:
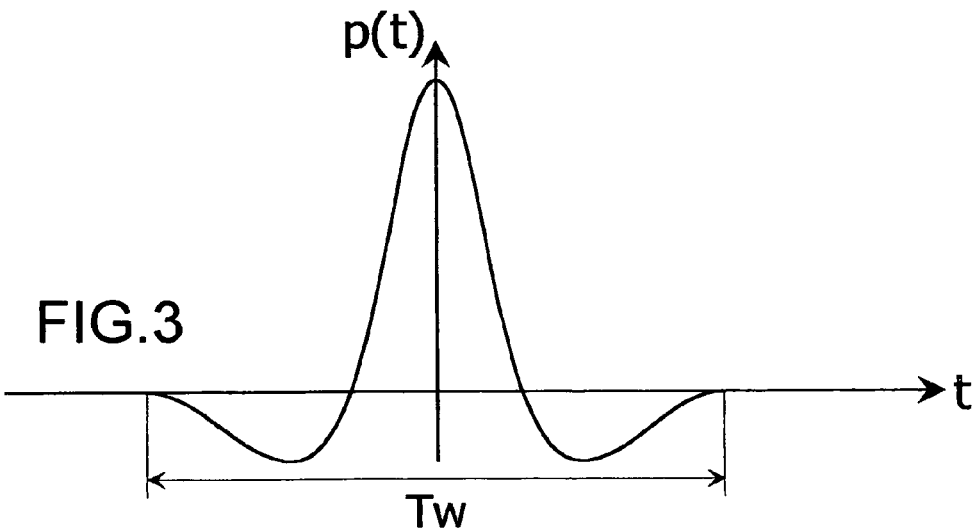
FIG. 3 is a chronogram depicting a pulse model which may be used for generating such a sequence.

FIG. 3 is another chronogram which depicts a possible shape p(t) which may be chosen for constituting the above-mentioned pulses. In the example depicted here, this pulse p(t) is defined as a derivative of the second order of a Gaussian function, which may be expressed mathematically as $p(t)=A \cdot [1-4\pi(t/Tw)^2] \cdot \exp(-2\pi(t/Tw)^2)$. Other pulse shapes known to those skilled in the art may, of course, be used in this same purpose.

Figure 4:
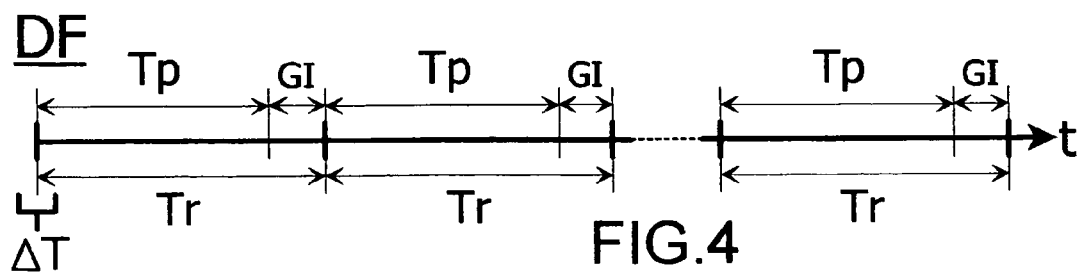
FIG. 4 is a chronogram depicting a data frame including a plurality of pulse sequences.

FIG. 4 is yet another chronogram which depicts a data frame DF formed by successive pulse sequences such as the one described above, each having a total duration Tp, a guard interval GI being periodically inserted between two such sequences in order to prevent alteration of a given sequence by a following one, which alterations could be caused, for example, by intermodulation products between said pulse sequences. This dataframe DF is thus constituted by successive frames having each a duration Tr, with Tr=Tp+GI, and including each a pulse sequence as described above.

A device intended to receive a data frame DF must thus be able to detect the beginning of a pulse sequence such as those described above during a given time interval $\Delta T$.

Figure 5:
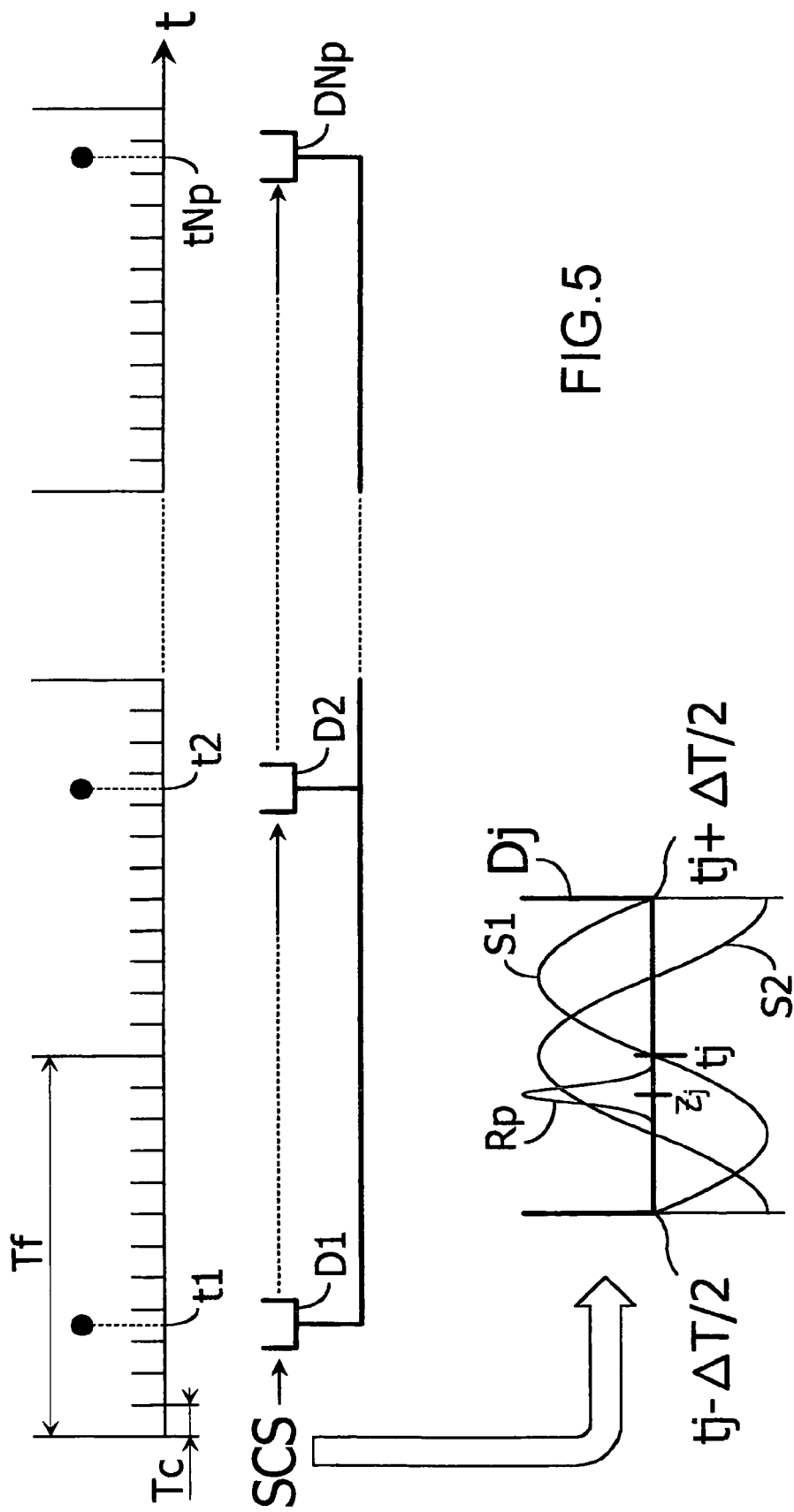
FIG. 5 is a chronogram depicting a signal detection step according to the invention.

FIG. 5 depicts how such a pulse sequence may advantageously be detected by a device intended to receive this sequence. According to the present invention, such a device will carry out a signal detection step SDS in the course of which Np detection windows Dj (for j=1 to Np) encompassing the time chips defined by the chip numbers are to be examined in search of pulses belonging to an expected pulse sequence, which pulses are shown in dashed lines in FIG. 5. Each detection window Dj (for j=1 to Np) is wider than a single time chip duration Tc, and has a duration $\Delta T$, which means that carrying out the detection step SDS depicted here amounts to providing an answer to a problem consisting for a receiving device in determining if a pulse sequence transmitted under a known signature and intended to be received by said device has or not started during a given time interval $\Delta T$.

The method according to the invention only requires to scan selected time windows Dj centered on moments tj (for j=1 to Np) defined by their respective associated chip numbers, in search of expected pulses.

This enables to determine in a single step if a given pulse sequence starts or not within a given time interval $\Delta T$, whereas in the known detection technique, such a statement may only be established after performing numerous elementary correlations for achieving an exhaustive scanning of the whole duration Tp of said given sequence.

A possible way of carrying out the scanning of the detection windows Dj according to the invention is also shown in FIG. 5. Each detection window Dj is centered on a given instant tj and defined by lower and upper bounds respectively equal to tj$-\Delta T/2$ and tj$+\Delta T/2$. In this example, a detection value is computed as a mean value over all detection windows of a first and a second correlation between the received signal and a first and second sinusoidal signal S1 and S2, respectively, which first and second sinusoidal signals S1 and S2 are in phase quadrature with each other. This detection value will then be compared to a predetermined threshold value.

The efficiency of the method according to the invention is based on the following observation: since the width of a received pulse Rp occurring at an instant $\tau_j$ is far smaller than that of a detection window Dj, a correlation between the received signal and a sinusoidal signal, for example a first sinusoidal signal S1 expressed as $\sin(2\pi t/\Delta T)$, which correlation is defined as $$\int_{-\frac{\Delta T}{2}}^{\frac{\Delta T}{2}} p(t-\tau) \sin\left(\frac{2\pi t}{\Delta T}\right) dt$$

may be expressed as $$\sin\left(\frac{2\pi \tau}{\Delta T}\right) \cdot \int_{-\frac{\Delta T}{2}}^{\frac{\Delta T}{2}} p(t) dt, \text{ with } \int_{-\frac{\Delta T}{2}}^{\frac{\Delta T}{2}} p(t) dt = \alpha,$$

where $\alpha$ is proportional to the energy carried by the pulse Rp.

Each correlation performed between the received signal and one of the first and second sinusoidal signals S1 and S2 will preferably be squared so as to emphasize occurrences where a received pulse Rp is indeed present within detection window Dj, with respect to freak occurrences where a noise peak may produce a significant value of the scalar product described above, the amplitude of such a noise peak being lower than that of an actually received pulse Rp.

Due to the very nature of the pulse sequences to be detected, a time delay between an instant Tj of occurrence of a pulse Rp and the predetermined instant tj will be caused by a phase-shift affecting the whole sequence, so that this time delay tj$-\tau_j$ will have a constant value for all time windows. This will entail that an accumulation of the correlation values for all detection windows will automatically enable an in-phase addition of the received pulses, and thus an amplification of the impact of these pulses, simultaneously with an attenuation of the impact of freak pulses due to irrelevant noise, provided that the width $\Delta T$ of a detection window Dj is an integer multiple of the period of the first and second sinusoidal signals S1 and S2.

The inventors have furthermore observed that the use of a squared correlation value also enables to simplify the implementation of the detection step, since $\alpha^2 \cdot \cos^2(2\pi t/\Delta T) + \alpha^2 \cdot \sin^2(2\pi t/\Delta T) = \alpha^2$, which means that a sum of the results of the above described squared correlations will yield a detection value representative of the energy carried by the received signal.

The inventors have found that their empiric observations described hereinbefore may be explained as follows:

If a squared correlation is noted $(y|s(\cdot-\epsilon))^2$, where s and y are vectors representing an expected signal s(t) and the received signal y(t), respectively, the corresponding detection value may be expressed as a quadratic form given by:

$$Q(y) = E_{\varepsilon}\{(y \mid s(.-\varepsilon))^2\}$$

The received signal y(t) will be deemed corresponding to a state 111 in which $y(t)=A \cdot s(t-\epsilon)+n(t)$, t belonging to $[-\Delta T/2; Tp+\Delta T/2]$, if Q(y) exceeds a predetermined threshold value noted Tv, the received signal y(t) will be deemed corresponding to a state H0 in which $y(t)=n(t)$ where n(t) is constituted by noise, if Q(y)<Tv.

The predetermined threshold value Tv is defined on the basis of a chosen probability of false alarm noted Pfa, which is the highest possible value for the likelihood of having Q(y)>Tv while being in state H0, y(t) then being expressed as y(t)=n(t), which allows the threshold value Tv to be independent of the amplitude of the expected or received signal.

The inventors have found that the above quadratic form may be reduced in order to ease its implementation. Indeed, by observing that $y|s(\cdot-\epsilon) = {}^Ty \cdot s(\cdot-\epsilon) = {}^Ts(\cdot-\epsilon) \cdot y$, where y and s are column matrixes, and ${}^Ty$ the transposed row matrix of column matrix y, Q(y) may be rewritten in the form $Q(y)={}^Ty \cdot Q \cdot Y$, where Q is a matrix having components which do not depend on those of y.

The inventors have also observed that this matrix Q is quite hollow, and may be represented in the following form:

$$Q = \begin{bmatrix} 0 & 0 & 0 & 0 & 0 \\ 0 & M & & M & 0 \\ 0 & & & & 0 \\ 0 & M & & M & 0 \\ 0 & 0 & 0 & 0 & 0 \end{bmatrix},$$

where M is a sub-matrix which may be computed solely on the basis of the shape of the expected pulse p(t), the position of each sub-matrix M in the matrix Q being defined by the positions of the afore mentioned detection windows Dj, i.e. each sub-matrix M is centered on a point $a_{1,r}$ of the matrix Q whose coordinates in this matrix are (t1;tr), with 1 and r=1 to Np.

If each pulse p(t) is as described in FIG. 3, each sub-matrix M may for example be defined by $$M = E_{\varepsilon}\{(Tw/2)^2 p(.-\varepsilon).^T p(.-\varepsilon)\}.$$

The inventors have observed that each sub-matrix M may be written in the form of a diagonal matrix having diagonal components formed by eigenvalues corresponding to respective eigenvectors Vi (for i=1 to k), so that the quadratic form Q(y) may be rewritten as $$Q(y) = \sum_{i+1}^{k} \left( \sum_{j=1}^{np} \int_{Dj} Vi(t - tj) y(t) dt \right)^2,$$

which may be implemented by feeding the received signal y(t) to k correlating modules, each of which being intended to be activated during the Np detection windows and to compute a correlation over said windows between said received signal y(t) and a characteristic signal representative of a eigenvector Vi associated with said correlating module, output values delivered by said correlating modules being then accumulated and squared before being summed together in order to produce a value of Q(y) forming the detection value which will be compared to the predetermined threshold value $\rho$.

The invention as previously described thus corresponds to a situation in which only two eigenvectors are selected, which eigenvectors are approximated by sinusoidal signals.

Figure 6:
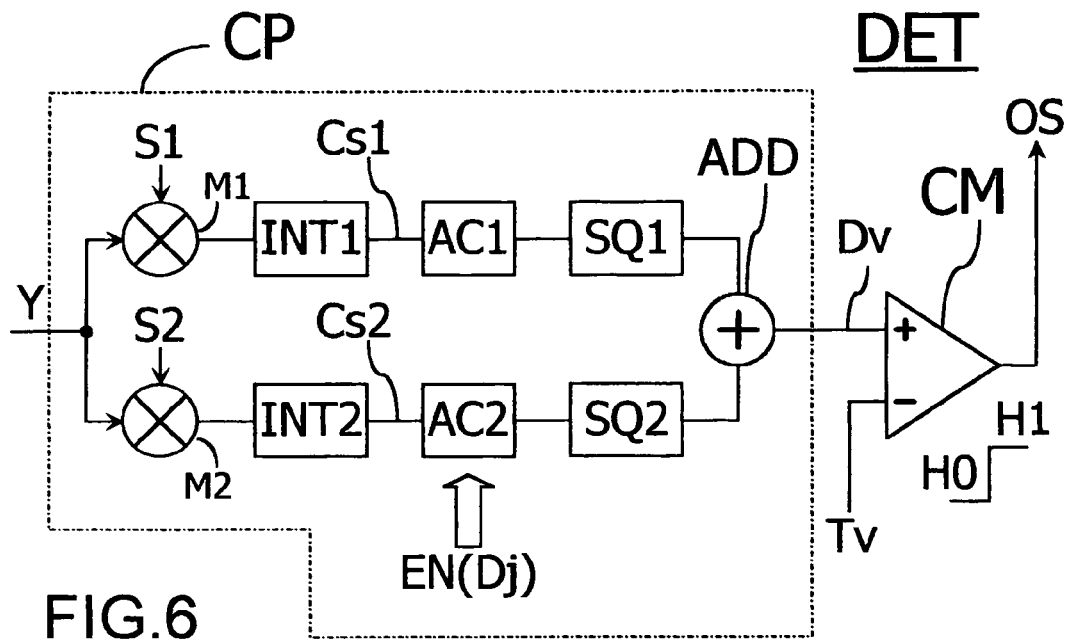
FIG. 6 is a block diagram depicting detection means according to a possible embodiment of the invention.

FIG. 6 schematically shows detection means DET intended to implement the above described detection step, and including computation means CP intended to produce a detection value Dv, which is to be compared to the threshold value Tv by comparison means CM which may be formed by a simple operational amplifier intended to deliver a two-state output signal OS whose value will determine whether an incoming pulse has been detected or not.

In the example shown here, the computation means CP include a first and a second signal mixer M1 and M2, for example constituted by Gilbert cells, intended to multiply a signal Y received by the receiver with a first and a second sinusoidal signal S1 and S2, respectively, with $S1=\sin(2\pi t/\Delta T)$ and $S2=\cos(2\pi t/\Delta T)$. The computation means CP further include first and second integrators INT1 and INT2, respectively intended to integrate signals outputted by the first and second signal mixers M1 and M2, and thus to deliver correlated signals Cs1 and Cs2, respectively resulting from a correlation between the received signal Y with the first sinusoidal signal S1, on the one hand, and with the second sinusoidal signal S2, on the other hand. The values of these correlated signals Cs1 and Cs2 are intended to be accumulated during successive detections windows Dj by means of first and second correlators AC1 and AC2 intended to be activated by means of an activation signal EN(Dj) only during said detections windows Dj, which means that the first and second correlation means formed by the respective assemblies of the first and second mixers M1 and M2 with the first and second integrators INT1 and INT2 are disabled outside of the detection windows Dj. A same result may be obtained in other embodiments by controlling the power supply of the mixers and/or of the integrators, which integrators may for example be formed by operational amplifiers provided with RC feedback loops.

The computation means CP include first and second squaring modules SQ1 and SQ2, respectively intended to produce a squared value of the contents of the first and second accumulating modules AC1 and AC2, which squared values are then to be added together by an additioner ADD also included in the computation means CP shown here, and intended to output a detection value Dv which will be proportional to the energy carried by the received signal Y, as explained hereinbefore.

Figure 7:
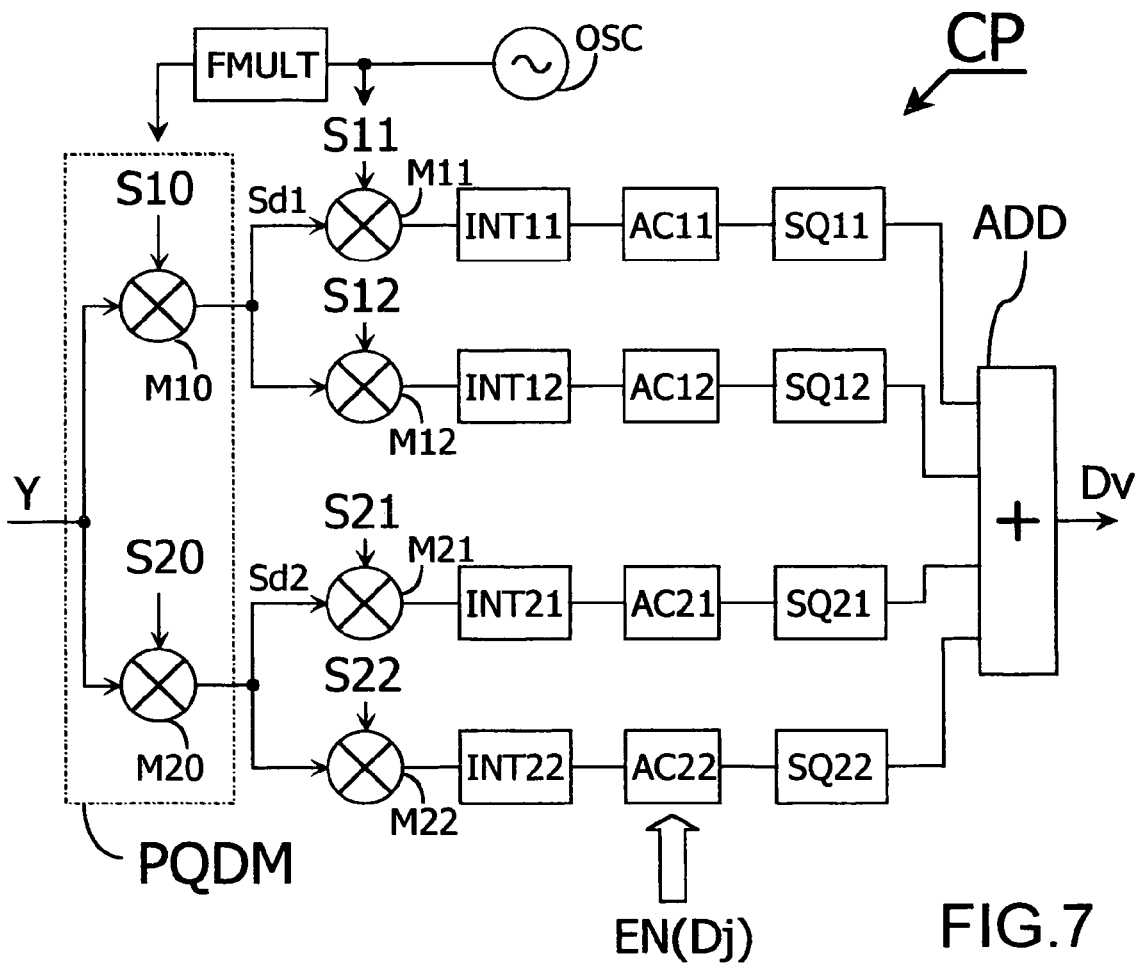
FIG. 7 is a block diagram depicting computing means included in detection means according to a preferred embodiment of the invention.

FIG. 7 schematically shows computation means CP which include a phase quadrature demodulator PQDM intended to be fed with the received signal Y and to respectively deliver a first and a second demodulated signal Sd1 and Sd2 to first and second correlation means (M11, INT11) and (M12, INT12), on the one hand, and to third and fourth correlation means (M21, INT21) and (M22, 1NT22), on the other hand, which first and second demodulated signals Sd1 and Sd2 are in phase quadrature with respect to each other.

The first, second, third and fourth correlation means (M11, INT11), (M12, INT12), (M21, INT21) and (M22, INT22) are respectively followed by first, second, third and fourth accumulating modules AC11, AC12, AC21 and AC22, themselves followed by first, second, third and fourth squaring modules SQ11, SQ12, SQ21 and SQ22, the outputs of which being connected to an additioner ADD intended to deliver a detection value Dv in accordance with the explanations given above.

In this embodiment of the invention, the phase quadrature demodulator PQDM includes two mixers M10 and M20 intended to be fed with the received signal Y, on the one hand, and by demodulation signals S10 and S20 in phase quadrature with each other and having a so-called central frequency Fpc, the third and fourth sinusoidal signals S21 and S22 being then respectively formed by the first and second sinusoidal signals S11 and S22.

The central frequency is usually chosen in the art as equal to a median frequency for a spectral distribution of the energy carried by the incoming pulse sequences. If, for example, these pulse sequences feature a frequency varying from 3.1 to 10.6 GHz, the central frequency Fpc may be chosen close to 6.35 GHz.

In the embodiment shown here, the detection means further include:
- an oscillator OSC, for example a voltage-controlled oscillator, intended to generate an output signal from which the first and second sinusoidal signals S11 and S12 will be derived, and
- a frequency multiplier FMULT intended to receive said output signal and to deliver respective first and second demodulation signals S10 and S20 to the mixers M10 and M20 included in the phase quadrature demodulator PQDM.

Such an embodiment of the invention thus enables to obtain optimal clock stability by using a same oscillator OSC at the receiving end for performing both a demodulation and a detection of an incoming pulse sequence.

In other embodiments of the invention, one may also choose to use a high-frequency oscillator for producing the first and second demodulation signals S10 and S20, and to use a frequency divider for producing the first and second sinusoidal signals S11 and S12 on the basis of the signals outputted by such a high-frequency oscillator.

It seems worthy of notice that the embodiment of the invention shown in FIG. 6 may be considered as a particular application of the embodiment shown in FIG. 7, for which a central frequency Fpc equal to 0 will have been chosen, which means, in other terms, that the embodiment shown in FIG. 6 is well-suited for baseband applications.

The embodiments of the invention described hereinbefore have a simple structure and may be constructed at a very low cost. Furthermore, all above-described mixers, multipliers and modules may be formed by analog circuits which are known for their high processing speed and do not require any sampling, which will in turn enable to further reduce the processing power and the time required for performing a signal detection step according to such embodiments of the invention.

The invention claimed is:

1. A method for receiving data in an Ultra-Wide Band (UWB) telecommunication system including at least one transmitter and one receiver, said transmitter being configured to transmit a UWB signal formed by at least one sequence of Np pulses over Np time windows where Np is a predetermined integer number, each pulse being enclosed within a time chip whose position within its relevant time window is defined by a chip number, said method comprising:
   performing a first correlation and a second correlation over Np detection windows encompassing time chips defined by chip numbers of a signal representative of a received UWB signal with a first sinusoidal signal and a second sinusoidal signal, respectively, wherein the first sinusoidal signal and the second sinusoidal signal are in phase quadrature with respect to each other, and each correlation includes multiplication and integration;
   producing a first correlation result and a second correlation result from said performing step;
   combining said first correlation result and said second correlation result into a detection value;
   comparing said detection value to a predetermined threshold value to obtain a comparison result; and
   determining whether an expected pulse sequence is detected based on said comparison result.

2. The method according to claim 1, wherein the combining step comprises squaring each of the correlation values and adding together all resulting squared values to obtain the detection value.

3. The method as claimed in any one of claims 1 or 2, wherein the predetermined threshold value is independent of an amplitude of the received signal.

4. An Ultra-Wide Band (UWB) telecommunication system, comprising:
   at least one transmitter configured to transmit a UWB signal formed by at least one sequence of Np pulses over Np time windows, each pulse being enclosed within a time chip whose position within its relevant time window is defined by a chip number; and
   a receiver including
      a signal detector configured to perform an examination of Np detection windows encompassing the time chips defined by the chip numbers to determine the presence of an expected pulse sequence, said signal detector including at least a first correlator and a second correlator configured to correlate a signal representative of a received UWB signal with at least a first sinusoidal signal and a second sinusoidal signal, respectively, the first sinusoidal signal and the second sinusoidal signal being in phase quadrature with respect to each other, said first correlator and said second correlator including a multiplier and an integrator, and being configured to be activated during said detection windows and to produce a first correlation value and a second correlation value to be combined together into a detection value to be fed to a comparator configured to compare said detection value with a predetermined threshold value to produce a comparison result; and
      a determining unit configured to determine whether the expected pulse sequence is detected based on said comparison result.

5. The telecommunication system as claimed in claim 4, wherein the signal detector further comprises:

at least a third correlator and a fourth correlator configured to correlate a signal representative of the received UWB signal with at least a third sinusoidal signal and a fourth sinusoidal signal, respectively, the third sinusoidal signal and the fourth sinusoidal signals being in phase quadrature with respect to each other, and configured to be activated during said detection windows and to produce a third correlation value and fourth correlation value to be combined together with the first correlation value and second correlation value into the detection value to be fed to the comparator; and a phase quadrature demodulator configured to be fed the received signal and to deliver a first demodulated signal to the first correlator and the second correlator, and to deliver a second demodulated signal to the third correlator and the fourth correlator, the first demodulated signal and the second demodulated signal being in phase quadrature with respect to each other.

6. The telecommunication system as claimed in claim 5, wherein the phase quadrature demodulator includes two mixers configured to be fed with the received UWB signal, and by demodulation signals in phase quadrature with each other having a central frequency, the third and fourth sinusoidal signals being then respectively formed by the first and second sinusoidal signals, the signal detector further comprises:

an oscillator configured to generate an output signal from which the first and second sinusoidal signals will be derived, and a frequency multiplier configured to receive said output signal and to deliver respective first and second demodulation signals to the phase quadrature demodulator.

7. The telecommunication system as claimed in any one of claims 4 to 6, wherein the signal detector further comprises:

a plurality of accumulating modules, each of which is configured to accumulate output values delivered by one of said correlators, a plurality of squaring modules, each of which is configured to produce a squared value of the contents of one of said accumulating modules, and an adder configured to compute a sum of output values delivered by the squaring modules in order to produce the detection value to be compared to the predetermined threshold value.

8. An Ultra-Wide Band (UWB) receiver configured to receive a UWB signal formed by at least one sequence of Np pulses over Np time windows, each pulse being enclosed within a time chip whose position within its relevant time window is defined by a chip number, said receiver comprising:

a signal detector configured to perform an examination of Np detection windows encompassing the time chips defined by the chip numbers in search of an expected pulse sequence, said signal detector including at least a first correlator and a second correlator configured to correlate a signal representative of a received UWB signal with at least a first sinusoidal signal and a second sinusoidal signal, respectively, the first sinusoidal signal and the second sinusoidal signal being in phase quadrature with respect to each other, said first correlator and said second correlator including a multiplier and an integrator, and being configured to be activated during said detection windows and to produce a first correlation value and a second correlation value;

an adder configured to combine together the first correlation value and the second correlation value into a detection value; and a comparator configured to compare said detection value with a predetermined threshold value to obtain a comparison result; and a determining unit configured to determine the presence of the expected pulse sequence based on said comparison result.

* * * * *